(12) United States Patent
Kaplan et al.

(10) Patent No.: US 7,395,389 B2
(45) Date of Patent: Jul. 1, 2008

(54) EXTENDING NON-VOLATILE STORAGE AT A COMPUTER SYSTEM

(75) Inventors: Keith Stuart Kaplan, Bothell, WA (US); Gunnar Mein, Woodinville, WA (US); Walter J. Kennamer, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 208 days.

(21) Appl. No.: 11/460,470

(22) Filed: Jul. 27, 2006

(65) Prior Publication Data

US 2008/0028169 A1 Jan. 31, 2008

(51) Int. Cl.
*G06F 13/00* (2006.01)

(52) U.S. Cl. .................................. 711/162; 711/170

(58) Field of Classification Search ............... 711/162, 711/170
See application file for complete search history.

(56) References Cited

U.S. PATENT DOCUMENTS

| | | | |
|---|---|---|---|
| 6,418,539 | B1 | 7/2002 | Walker |
| 6,754,696 | B1 | 6/2004 | Kamath et al. |
| 6,826,666 | B2 * | 11/2004 | Berkowitz et al. .......... 711/162 |
| 6,850,959 | B1 | 2/2005 | Golds |
| 6,952,698 | B2 | 10/2005 | Delaire et al. |
| 7,003,780 | B2 | 2/2006 | Peloquin et al. |
| 2003/0105781 | A1 | 6/2003 | Morris |
| 2003/0110188 | A1 | 6/2003 | Howard et al. |
| 2003/0149736 | A1* | 8/2003 | Berkowitz et al. .......... 709/213 |
| 2004/0039756 | A1 | 2/2004 | Bromley |
| 2004/0260977 | A1 | 12/2004 | Ji et al. |
| 2005/0004979 | A1* | 1/2005 | Berkowitz et al. .......... 709/203 |
| 2005/0246401 | A1 | 11/2005 | Edwards et al. |
| 2006/0015779 | A1 | 1/2006 | Nissan-Messing et al. |
| 2006/0020753 | A1 | 1/2006 | Cochran et al. |

OTHER PUBLICATIONS

Gaspar, Ruben, "Shadow copies for restoring files", 4 pages http://cnlart.web.cern.ch/cnlart/2005/002/9 (PDF Attachment Article 1).
Jonge, Wiebred de, "The Logical Disk: A New Approach to Improving File Systems", 14 pages http://www.cs.utah.ed/~wilson/papers/logical-disk.pdf (PDF Attachment Article 2).
Shinkai, Yoshitake, et al., "HAMFS File System" http://ieeexplore.ieee.org/search/wrapper.jsp?arnumber=805095 (PDF Attachment Article 3).
Chao, Chia, et al., "Mime: a high performance parallel storage device with strong recovery guarantees", HPL-CSP-92-9 revl, Mar. 18, 1992, revised Nov. 6, 1992 http://www.hpl.hp.com/research/ssp/papers/HPL-CSP-92-9rev1.pdf (PDF Attachment Article 4).

* cited by examiner

*Primary Examiner*—Reba I Elmore
(74) *Attorney, Agent, or Firm*—Workman Nydegger

(57) ABSTRACT

The present invention extends to methods, systems, and computer program products for extending non-volatile storage at a computer system. In some embodiments, a file operation is performed on at least one shadow copy of a file that is perceived by an application to be stored on a single volume. A plurality of shadow copies of a file can be accessed using durable file identifiers that are durable across changes to other file characteristics. It is indicated back to the application that the file operation was performed on the file perceived to be stored on the single volume. Storage capabilities are enhanced through migration and/or replication of files to newly added volumes.

20 Claims, 4 Drawing Sheets

EXTENDING NON-VOLATILE STORAGE AT A COMPUTER SYSTEM

CROSS-REFERENCE TO RELATED APPLICATIONS

Not Applicable.

BACKGROUND

1. Background and Relevant Art

Computer systems and related technology affect many aspects of society Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, the performance of many computing tasks are distributed across a number of different computer systems and/or a number of different computing components.

Data for computer systems it typically stored on and accessed from disks, such as, for example, magnetic disks, optical disks, etc. A software component such as a volume stack receives I/O commands from upper layer modules (e.g., applications) and interfaces with a physical component (e.g., a magnetic platter) to implement the I/O commands. Typically disks suffer from at least two problems: disk fill and disk failure.

A disk fills when its available storage space is filled with data. When a disk becomes full, there is typically no way to seamlessly add new a disk drive to expand available storage space. Some operating systems have attempted to address this issue. At least one operating system allows multiple disks to be bound together into a "volume set". However, a drive containing the operating system can not be included in the volume set. Thus, for a user with an operating system and document directory stored in the same disk, there may be no way to create a volume set when adding a second disk dive.

Further once a volume set is created, the disks in the volume set can never be removed, even if one of them is beginning to fail, or if a user wishes to replace an old smaller disk and a new larger and faster disk. Additionally, if one disk in a volume set fails, other disks in the volume set typically become inaccessible.

Failure of a disk drive can result in data becoming inaccessible. Some types of disks, such as, for example, magnetic hard disks, include moving mechanical parts. Thus, these types of disks are more likely to suffer from failure, relative to other computer system components such as processors and system memory. Failure of a hard drive can result in the loss of years of data that is potentially hard to replace.

Some techniques to reduce the chances of losing data due to disk failure have been developed. For example, software mirroring "mirrors" the complete contents of one drive to another drive. However, these techniques have several limitations. For example, due to significant system level interactions, it may be difficult, if not impossible, to create a mirror set for a volume that includes an operating system. Further, mirror sets typically can not include external drives and require that two disks be of the same size. Additionally, mirroring has at least some needless overhead since every sector, even unused sectors and sectors for unimportant temporary files, must be copied to both disks.

BRIEF SUMMARY

The present invention extends to methods, systems, and computer program products for extending non-volatile storage at a computer system. In some embodiments, a file operation is performed. In at least one of these embodiments, a file operation command is received from an application. The file operation command indicates that a file operation is to be performed on a file perceived by the application to be stored on a first volume. A file table entry for the file is accessed from a file table stored on the first volume.

The file table entry includes file metadata with links to a plurality of shadow copies of the file on a corresponding plurality of volumes respectively. The plurality of shadow copies include a shadow copy designated as the master shadow copy and one or more other shadow copies designated as secondary shadow copies. The master shadow copy and the one or more secondary shadow copies are accessed from corresponding appropriate volumes. The file operation is performed on at least one shadow copy. It is indicated to the application that the file operation was performed on the file perceived to be stored on the first volume.

In at least another of these embodiments, a file operation command is received from an application. The file operation command indicates that a file operation is to be performed on a file perceived by the application to be stored on the first volume. It is determined that one or more shadow copies, including at least a master shadow copy, of the file exist on one or more corresponding volumes respectively.

A durable file identifier is used to access the master shadow copy. The durable file identifier is durable across changes to other file characteristics such that if any file characteristics of the file, including the file name, are changed, the durable identifier continues to reference the master shadow copy. The file operation is performed at least on the master shadow copy. It is indicated to the application that the file operation was performed on the file perceived to be stored on the first volume.

In other embodiments, the storage capabilities of the computer system are enhanced in response to a change in volume configuration. An indication that a new volume has been attached to a computer system is received. Configuration rules are referred to to determine how a portion of available storage space on the new volume is to be utilized to enhance the storage capabilities of the computer system The storage capacity of the first volume and a portion of the available storage space of the new volume are logically combined. The combined storage capacity is made available to applications at the computer system as if it were all on the first volume.

A directory is created within an existing directory structure of the new volume in response to receiving the indication and in accordance with the configuration rules. The subdirectory is for storing shadow copies of files stored on the first volume. A file from the first volume is copied into the created directory to implement a storage capability enhancement indicated in the configuration rules. File metadata is added to a file table entry for the file stored on the first volume. The file metadata identifies the copy of the file in the created directory as a shadow copy of the file.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
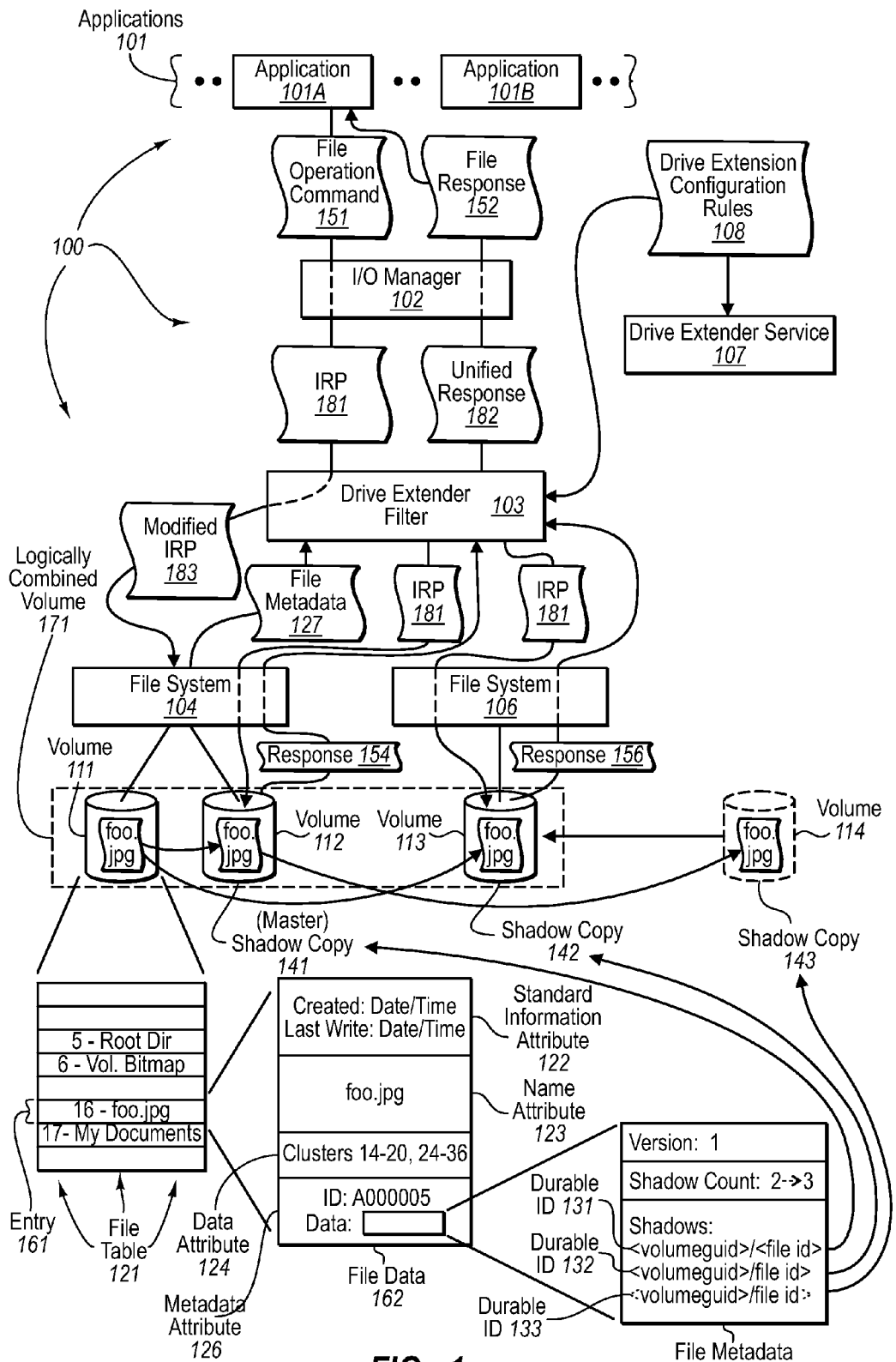
FIG. 1 illustrates an example computer architecture that facilitates extending non-volatile storage at a compute system.

The present invention extends to methods, systems, and computer program products for extending non-volatile storage at a computer system. In some embodiments, a file operation is performed. In at least one of these embodiments, a file operation command is received from an application. The file operation command indicates that a file operation is to be performed on a file perceived by the application to be stored on a first volume. A file table entry for the file is accessed from a file table stored on the first volume.

The file table entry includes file metadata with links to a plurality of shadow copies of the file on a corresponding plurality of volumes respectively. The plurality of shadow copies include a shadow copy designated as the master shadow copy and one or more other shadow copies designated as secondary shadow copies. The master shadow copy and the one or more secondary shadow copies are accessed from corresponding appropriate volumes. The file operation is performed on at least one shadow copy. It is indicated to the application that the file operation was performed on the file perceived to be stored on the first volume.

In at least another of these embodiments, a file operation command is received from an application. The file operation command indicates that a file operation is to be performed on a file perceived by the application to be stored on the first volume. It is determined that a one or more shadow copies, including at least a master shadow copy, of the file exist on one or more corresponding volumes respectively.

A durable file identifier is used to access the master shadow copy. The durable file identifier is durable across changes to other file characteristics such that if any file characteristics of the file, including the file name, are changed, the durable identifier continues to reference the master shadow copy. The file operation is performed at least on the master shadow copy. It is indicated to the application that the file operation was performed on the file perceived to be stored on the first volume.

In other embodiments, the storage capabilities of the computer system are enhanced in response to a change in volume configuration. An indication that a new volume has been attached to a computer system is received. Configuration rules, for example, stored in a text file, are referred to determine how a portion of available storage space on the new volume is to be utilized to enhance the storage capabilities of the computer system The storage capacity of the first volume and a portion of the available storage space of the new volume are logically combined. The combined storage capacity is made available to applications at the computer system as if it were all on the first volume.

A directory is created within an existing directory structure of the new volume in response to receiving the indication and in accordance with the configuration rules. The subdirectory is for storing shadow copies of files stored on the first volume. A file from the first volume is copied into the created directory to implement a storage capability enhancement (e.g., replication, migration, etc.) indicated in the configuration rules. File metadata is added to a file table entry for the file stored on the first volume. The file metadata identifies the copy of the file in the created directory as a shadow copy of the file.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates extending non-volatile storage at a compute system. Computer architecture 100 includes applications 101, I/O Manager 102, drive extender filter 103, drive extender service 107, file systems 104 and 106, and volumes 111, 112, and 113. Each of the components can be connected to a system bus that facilitates communication between the components.

Generally, applications, such as, for example, applications 101A and 101B can request file operations, such as, for example, file create, file rename, file delete, file open, file close, etc., be performed on files in file system volumes. I/O manager 102 can receive file operation requests and convert the file operation requests into compatible messages (e.g., into I/O request packets ("IRP") for processing by a file system. Drive extender filter 103 is situated between I/O manager 102 and file system 104 (e.g., in a volume stack). Drive extender filter 103 can intercept file system compatible messages from I/O manager 102 to a file system, such as, for example, IRPs, and process the system compatible messages to implement the principles of the present invention. For example, drive extender filer 103 can modify IRPs received from I/O manager 102 to indicate different file operations and can distribute (original or modified) IRPs to a plurality of different file systems when appropriate.

Generally, the file systems 104 and 106 are configured to receive compatible messages (e.g., IRPs), perform corresponding file operations, and respond indicating the outcome of the file operations back to I/O manager 102 (e.g., in other IRPs). For example, file systems 104 and 106 can be configured to fill in certain fields in an IRP, then pass the IRP back to the I/O manager. Drive extender filter 103 can also intercept file system compatible messages from file systems 104 and 106 to I/O manager 102 and process the system compatible messages to implement the principles of the present invention. For example, drive extender filer 103 can modify IRPs received from file systems 104 and 106 to indicate different responses and can unify (original or modified) IRPs into a file response for sending back to an application.

Drive extension configuration rules 108 indicate storage capability enhancements that are to be provided in computer architecture 100. For example, drive extension configuration rules 108 can indicate that a plurality of copies of a file is to be retained (e.g., replicated) for redundancy. Configuration rules can also indicate that a file is to be migrated from a first volume to a second volume to free up storage space on the first volume. Combinations of enhancements can also be indicated. For example, drive extension configuration rules 108 can indicate that a file is to be migrated from a first volume and stored on a plurality of other volumes to both free up space on the first volume and provide redundancy. When receiving, process, modifying, and sending file system compatible messages (e.g., IRPs), drive extender filter 103 can do so in accordance with drive extension configuration rules 108.

Drive extender service 107 is configured to monitor computer architecture 100 for operations that are to be performed to implement storage capability enhancements indicated in drive extension configuration rules 108. For example, when a new volume is attached to computer architecture 100, drive extender service 107 can logically combine a portion of the storage space of the new volume with the storage space of other volumes. Drive extender filter 103 and drive extender 107 can interoperate to represent to applications 101A and 101B that there is one volume having combined storage space taken from a plurality of different volumes. For example, applications 101A and 101B can issue a check for the free space on volume 111. In response, the free space of logically combined volume 171 as the "C:/" drive can be returned even though logical combined volume 171 includes portions of volumes 111, 112, and 113 (and might otherwise be represented as separate "C:/" "D:/" and "E:/" drives).

Drive extender service 107 can operate in the background to copy files, join new volumes, etc, when resources of computer architecture 100 are not heavily consumed by other processes.

File table 121 includes entries for files accessible at volume 111. Each entry can contain file data representing the characteristics of a corresponding file. For example, entry 161 contains file data 162 for a file named foo.jpg. File data can include file metadata including various attributes that describe characteristics of a file, such as, for example, create date/time, last write date/time, name, data clusters used by the file, and a reparse point. A reparse point can further contain a reparse point ID and reparse data. For example, file data 162 includes metadata attribute 126 that contains file metadata 127.

Drive extender filter 103 and drive extender service 107 can utilize file file metadata to assist in providing storage enhancements in accordance with drive extension configuration rules 108. For example, it may be that drive extension configuration rules 108 indicate that on or more copies of a file are to be maintained for redundancy. Drive extender filter 103 and drive extender service 107 can manipulate IRPs and other file system communication to represent to applications that different copies of a file stored on different volumes are accessible via single volume. Thus, diver extender filter 103 and drive extender service 107 can cause applications to perceive that a file is stored on a specified volume, when the file is actually stored on a different volume included in a logically combined volume. For example, drive extender filter 103 and drive extender service 107 can represent to applications 101A and 101B that foo.jpg is stored at volume 111 (a "C:/" drive), when copies of foo.jpg are actually stored at volumes 112 and 113 (e.g., that otherwise be a "D/" and a drive E:/" drive).

When a copy of a file is stored at a volume other than that represented to applications, the copy of the file can be referred to as a "shadow copy" of the file. Thus, copies of foo.jpg stored at volumes 112 and 113 can be referred to as shadow copies 141 and 142 of foo.jpg. In some embodiments, a specified shadow copy is designated as a master shadow copy and any other shadow copies (if they exist) are designated as secondary shadow copies. In these embodiments, drive extender filter 103 performs requested file operations on the master shadow copy. Subsequently, drive extender service 107 propagates the requested file operations to any secondary shadow copies, for example, when the resources of computer architecture 100 are not under heavy use by other processes. Some file operations are performed on the shadow copy and other file operations are perform on the shadow copy and one or more other shadow copies. For example, reads and writes can be performed on the master shadow copy (and subsequently propagated). On the other hand, deletes and renames can be performed on the master shadow copy and any secondary shadow copies at essentially the same time.

Generally, files on volumes used for migration and replication are not marked in any special way to identify that they are shadow copies. Thus, shadow copies can be stored along with other files on a volume, for example, if a volume already contains files when it is included in logically combined volume 171. To avoid naming conflicts with existing files on a volume, shadow files can be created under a specified (sub) directory (e.g., a "\DE" directory) of the volume. Migrated files can retain their original name and path underneath the specified (sub)directory. For example, if file C:\A\B.txt is migrated to the E: volume, the file can be copied to E:\DE\A\B.txt File metadata can include durable IDs for accessing shadow copies of a file. For example, file metadata 127 includes durable IDs 131 and 132 for accessing shadow copies 141 and 142 of foo.jpg. A durable ID, such as, for example, an NTFS file ID, is an ID that is retained even when other characters of a file, such as, for example, a file name, are changed. For example durable IDs 131 and 132 can be used to access shadow copies 141 and 142 respectively, even if foo.jpg is renamed or moved to another directory. A durable ID can include a portion that identifies a specified volume and a portion that identifies a specific file in the context of the specified volume. For example, a durable ID can include a globally unique identifier for a volume along with a file ID (e.g, <volume guid>/<file id>. A durable ID can be unique across a set of volumes. In some embodiments, a <file id> portion is an index to an entry in a master file table array and a sequence number indicating how many times the entry has been used. As the file entry is reused, the sequence number is incrementally increased.

Figure 2:
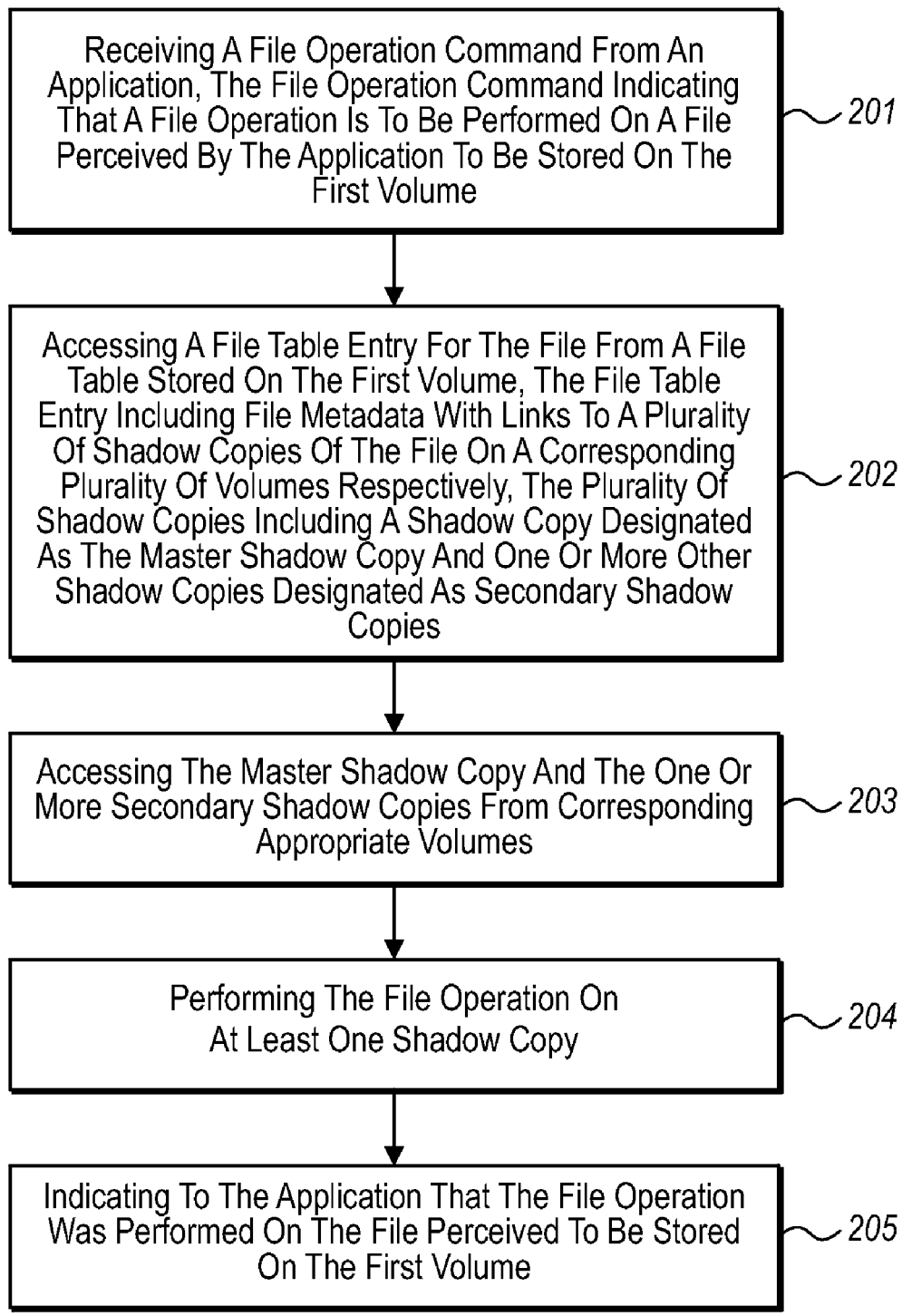
FIG. 2 illustrates a flow chart of an example method for performing a file operation.

FIG. 2 illustrates a flow chart of an example method 200 for performing a file operation. Method 200 will be described with respect to the components and data in computer architecture 100.

Method 200 includes an act of receiving a file operation command from an application, the file operation command indicating that a file operation is to be performed on a file perceived by the application to be stored on the first volume (act 201). For example, drive extender filter 103 can receive an IRP 181 (representative of file operation command 151) from application 101A. IRP 181 can indicate that a file operation (e.g., file create, file delete, etc.) is to be performed on foo.jpg that application TOT A perceives to be stored on volume 111.

Method 200 includes an act of accessing a file table entry for the file from a file table stored on the first volume, the file table entry including file metadata with links to a plurality of shadow copies of the file on a corresponding plurality of volumes respectively, the plurality of shadow copies including a shadow copy designated as the master shadow copy and one or more other shadow copies designated as secondary shadow copies (act 202). In response to receiving IRP 181, drive extender filter 103 retains the requested file operation command contained in IRP 181. Drive extender filter 103 can also modify the contents of IRP 181 resulting in modified IRP 183 (or a new message) representative of a request for file metadata for shadow copies foo.jpg. Drive extender filter 103 can send modified IRP 183 to file system 104 to request file metadata for foo.jpg. In response to modified IRP 183, file system 104 can access entry 161 and retrieve file metadata 127, including durable IDs 131 and 132. File system 104 can then return file metadata 127 to drive extender filter 103.

Method 200 includes an act of accessing the master shadow copy and one or more secondary shadow copies from corresponding appropriate volumes (act 203). For example, drive extender 103 can utilize durable IDs 131 and 132 to access shadow copy 141 and shadow copy 142 from volumes 112 and 113 respectively. Drive extender 103 can access any identified shadow copies to insure that the requested file operation is implemented for at least one shadow copy. When the shadow copy designated as the master shadow copy is not available, for example, when a volume has failed, drive extender filter 103 can designate one of the secondary shadow copies as the new master shadow copy. For example, if shadow copy 141 is not available, drive extender filter 103 can designate shadow copy 142 as the new master shadow copy.

Method 200 includes an act of performing the file operation command at least on the master shadow copy (act 204). For example, drive extender filter 103 can send IRP 181 to file system 104 to perform file operation command 151 on shadow copy 141. Alternately, if shadow copy 141 is not available, drive extender filter 103 can send IRP 181 to the file system of a newly designated master shadow copy to perform file operation command 151 on the newly designated master shadow copy.

The appropriate file system can respond to drive extender filter 103 indicate that the file operation was or was not successfully performed. For example, if IRP 181 was directed at shadow copy 141, file system 104 can respond with response 154. On the other hand, if IRP 181 was directed at shadow copy 142, file system 106 can respond with response 156. When a response indicates that a file operation was not successful, drive extender filter 103 can designate yet another shadow copy as the master copy and send IRP 181 to the file system for the newly designated master shadow copy. When a response indicates that a file operation was successful, drive extender service 107 can subsequently propagate the file operation command to any secondary shadow copies.

Method 200 includes an act of indicating to the application that the file operation was performed on the file perceived to be stored on the first volume (act 205). For example, drive extender filter 103 can send unified response 182 (also an IRP) to I/O manager 102. Unified response 182 combines the responses of different file systems in to single response to I/O manage 182. When at least one file system response (e.g., response 154 or 156) indicates a file operation was successfully performed on at least one shadow copy, unified response 182 can indicate that the file operation was successful. On the other hand, when file system responses indicate that the file operation was unsuccessful for all shadow copies, unified response 182 can indicate that the file operation was unsuccessful. I/O manager 102 can convert unified response 182 into file response 152 for compatibility with application 101A and send file response 152 to application 101A.

Figure 3:
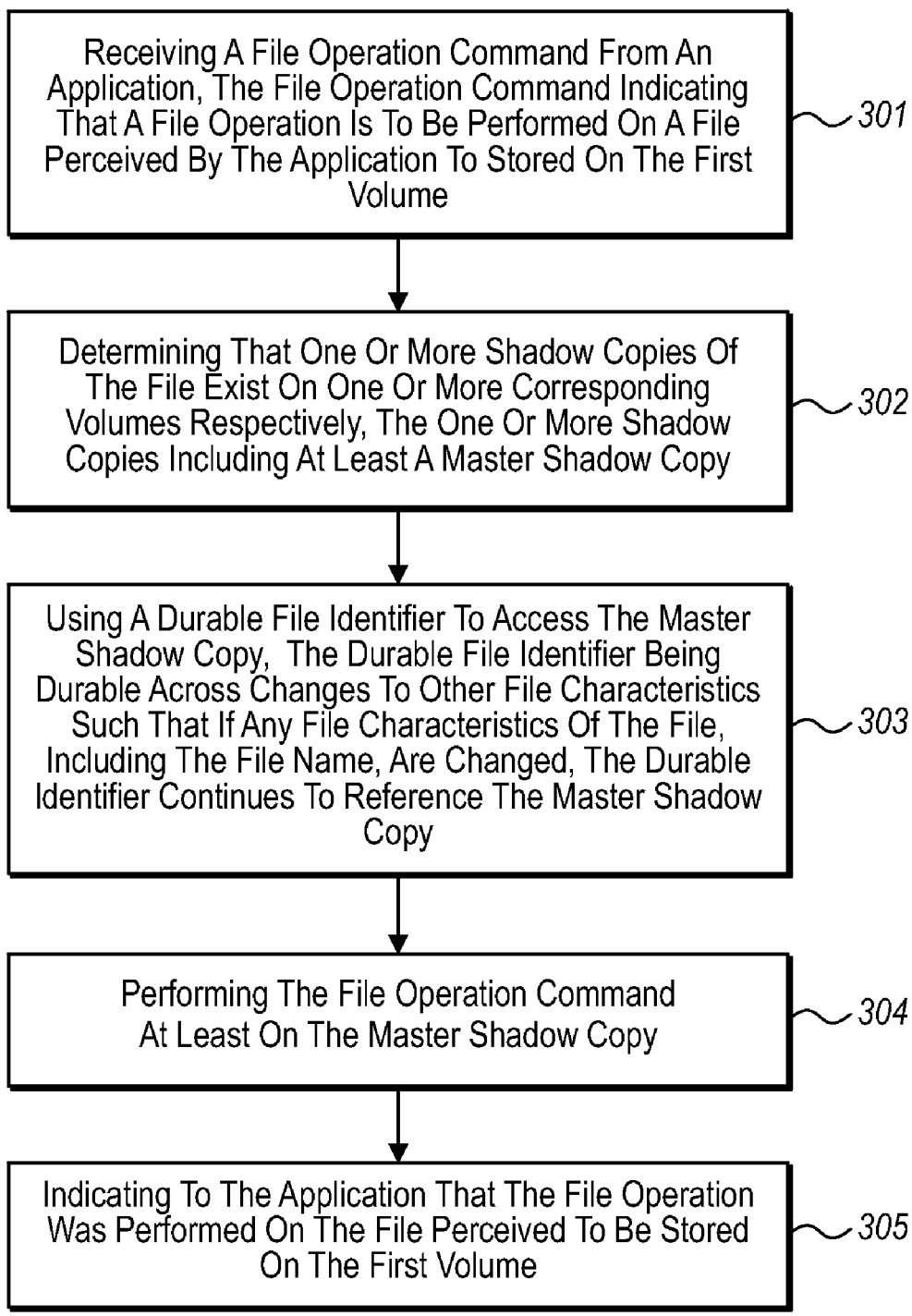
FIG. 3 illustrates a flow chart of another example method for performing a file operation.

FIG. 3 illustrates a flow chart of another example method for performing a file operation. Method 300 will be described with respect to the components and data in computer architecture 100

Method 300 includes an act of receiving a file operation command from an application, the file operation command indicating that a file operation is to be performed on a file perceived by the application to be stored on the first volume (act 301). For example, drive extender filter 103 can receive an IRP 181 (representative of file operation command 151) from application 101A. IRP 181 can indicate that a file operation (e.g., file create, file delete, etc.) is to be performed on foo.jpg that application 101A perceives to be stored on volume 111.

Method 300 includes an act of determining that one or more shadow copies of the file exist on one or more corresponding volumes respectively, the one or more shadow copies including at least a master shadow copy (act 302). For example, drive extender filter 103 can determine from file metadata 127 that shadow copies 141 and 142 of foo.jpg exist on volumes 112 and 113, and that shadow copy 141 is currently designated as the master shadow copy.

Method 300 includes an act of using a durable file identifier to access the master shadow copy, the durable file identifier being durable across changes to other file characteristics such that if any file characteristics of the file, including the file name, are changed, the durable identifier continues to reference the master shadow copy (act 303). For example, drive extender filter 103 can use durable ID 131 to access shadow copy 141.

Method 300 includes an act of performing the file operation at least on the master shadow copy (act 304). For example, drive extender filter 103 can perform a file operation corresponding to file operation command 151 on shadow copy 141. Method 300 includes an act of indicating to the application that the file operation was performed on the file perceived to be stored on the first volume (act 305). For example, drive extender filter 103 can indicate to I/O manager 102 that the file operation corresponding to file operation command 151 was performed on foo.jpg that application 101A perceives to be stored on volume 111.

Figure 4:
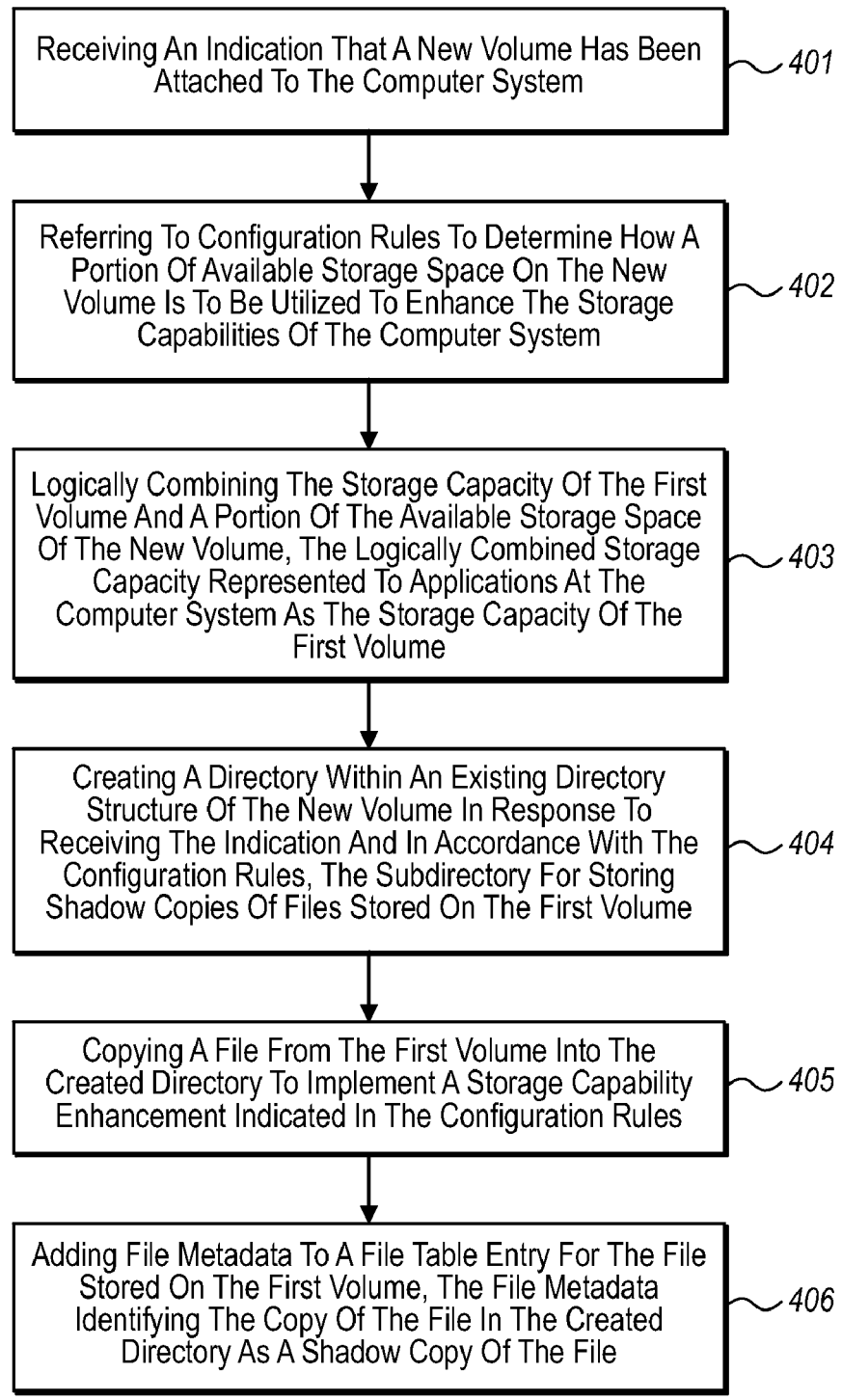
FIG. 4 illustrates a flow chart of an example method for enhancing the storage capabilities of a computer system in response to a change in volume configuration.

As drive extension configuration rules 108 and the configuration of volumes attached to computer architecture 100 changes, the volumes and shadow copies included in logically combined volume 171 can be correspondingly modified. FIG. 4 illustrates a flow chart of method 400 for enhancing the storage capabilities of a computer system in response to a change in volume configuration. Method 400 will be described with respect to the components and data in computer architecture 100

Method 400 includes an act of receiving an indication that a new volume has been attached to the computer system (act 401). For example, drive extender service 107 can receive an indication that volume 114 has been attached to computer architecture 100. Method 400 includes an act of referring to configuration rules to determine how a portion of available storage space on the new volume is to be utilized to enhance the storage capabilities of the computer system (act 402). For example, drive extender service 107 can refer to drive extension configuration rules 108 to determine how available storage on volume 114 is be utilized to enhance the storage capabilities of the computer architecture 100.

As previously described, drive extension configuration rules 108 can indicate that available storage is to be used to free up space on volume 111 and/or store shadow copies of files from volume 111. Drive extension configuration rules 108 can also indicate how many shadow copies of a file are to be maintained. Configuration for migration and replication can be differentiated on a per file extension basis or on a per directory basis. Thus, drive extension configuration rules 108 can indicate that some file types are to have 1 shadow copy, some file types 3 shadow copies, etc. Likewise, drive extension configuration rules 108 can indicate that some file types are to be migrated from volume 111 to other volumes and some file types can remain on volume 111, or that some files are to by migrated from one directory but not from another.

Drive extension configuration rules 108 can be stored in a system registry. Storage in a system registry makes drive extension configuration rules 108 easily accessible to both drive extender filter 103 and drive extender service 107. The registry can store an indication of a primary volume (e.g., volume 111) and its secondary volumes (e.g., volumes 112 and 113). The registry can also store which file types are to be migrated (e.g., by file extension or directory) and which file types are to be replicated (e.g., by file extension or directory). Various registry keys can be utilized to indicate migratable file extensions, replicatable file extensions, and volume GUIDs.

Method 400 includes an act of logically combining the storage capacity of the first volume and a portion of the available storage space of the new volume, the logically combined storage capacity represented to applications at the computer system as the storage capacity of the first volume (act 403). For example, drive extender service 107 can logically combine volume 114 into logically combined volume 171 and represent volume 114 as additional available storage space on volume 111.

Method 400 includes an act creating a directory within an existing directory structure of the new volume in response to receiving the indication and in accordance with the configuration rules, the subdirectory for storing shadow copies of files stored on the first volume (act 404). For example, extender service 107 can create a (sub)directory (e.g., a "\DE" directory) on volume 114 in response to detecting that volume 114 has been attached to computer architecture 100 and in accordance with drive extension configuration rules 108.

Method 400 includes an act of copying a file from the first volume into the created directory to implement a storage capability enhancement indicated in the configuration rules (act 405). For example, drive extender service 107 can copy shadow copy 143 of foo.jpg from volume 111 into a directory created on volume 114 to implement migration and/or replication indicated in drive extension configuration rules 108.

Method 400 includes an act of adding file metadata to a file table entry for the file stored on the first volume, the file metadata identifying the copy of the file in the created directory as a shadow copy of the file (act 406). For example, drive extender service 107 can change a shadow count in file metadata 127 and/or add durable ID 133 to file metadata 127 to identify shadow copy 143.

Embodiments of the present invention can facilitate transparent extension of non-volatile storage at a computer system in accordance with user and computer system configuration rules. Maintenance of a plurality of shadow copies of a file provides redundancy resulting in more efficient recovery if a volume fails. Further, file operations can be propagated between shadow copies in the background at times when systems resources are not otherwise under heavy use.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a first volume and one or more other volumes, the storage capacity of the first volume and a portion of at least one of the one or more other volumes logically combined, the logically combined storage capacity represented to applications at the computer system as the storage capacity of the first volume, access to the logically combined storage capacity being facilitated through reference to the first volume, a method for performing a file operation, the method comprising:

an act of receiving a file operation command from an application, the file operation command indicating that a file operation is to be performed on a file perceived by the application to stored on the first volume;

an act of accessing a file table entry for the file from a file table stored on the first volume, the file table entry including file metadata with links to a plurality of shadow copies of the file on a corresponding plurality of volumes respectively, the plurality of shadow copies including a shadow copy designated as the master shadow copy and one or more other shadow copies designated as secondary shadow copies;

an act of accessing the master shadow copy and the one or more secondary shadow copies from corresponding appropriate volumes;

an act of performing the file operation on at least one shadow copy; and an act of indicating to the application that the file operation was performed on the file perceived to be stored on the first volume.

2. The method as recited in claim 1, wherein the act of an act of receiving a file operation command from an application comprises an act of receiving a file operation command indicating that a file operation selected from among creating a file, deleting a file, and modifying a file is to be performed.

3. The method as recited in claim 1, wherein the act of accessing a file table entry for the file from a file table stored on the first volume comprises:

an act of receiving and retaining the file operation command; and an act of sending an entry table request to a file table on a primary volume, the request requesting file metadata for shadow copies of the file perceived to be on the first volume.

4. The method as recited in claim 1, wherein the act of accessing the master shadow copy and the one or more secondary shadow copies from corresponding appropriate volumes comprises an act of accessing the master shadow copy and the one or more secondary shadow copies from corresponding appropriate volumes from directories at the first volume and portions of the one or more other volumes respectively.

5. The method as recited in claim 1, wherein the act of accessing the master shadow copy and the one or more secondary shadow copies from corresponding appropriate volumes, comprises:

an act of detecting that the current master shadow copy is inaccessible;

an act of assigning one of the secondary shadow copies as the new master shadow copy in response to detecting that the current master shadow copy is inaccessible; and an act of accessing the new master shadow copy.

6. The method as recited in claim 1, wherein the act of performing the file operation on at least one shadow copy comprises an act of performing the file operation on the master shadow copy.

7. The method as recited in claim 1, wherein the act of indicating to the application that the file operation was performed on the file perceived to be stored on the first volume comprises an act of indicating to the application that the file operation was performed on the file perceived to be stored on the first volume even though the file operation was actually performed on a shadow copy of the file.

8. At a computer system including a first volume and one or more other volumes, the storage capacity of the first volume and a portion of at least one of the one or more other volumes logically combined, the logically combined storage capacity represented to applications at the computer system as the storage capacity of the first volume, access to the logically combined storage capacity being facilitated through reference to the first volume, a method for performing a file operation, the method comprising:

an act of receiving a file operation command from an application, the file operation command indicating that a file operation is to be performed on a file perceived by the application to be stored on the first volume;

an act of determining that one or more shadow copies of the file exist on one or more corresponding volumes respectively, the one or more shadow copies including at least a master shadow copy;

an act of using a durable file identifier to access the master shadow copy, the durable file identifier being durable across changes to other file characteristics such that if any file characteristics of the file, including the file name, are changed, the durable identifier continues to reference the master shadow copy;

an act of performing the file operation at least on the master shadow copy;

an act of indicating to the application that the file operation was performed on the file perceived to be stored on the first volume.

9. The method as recited in claim 8, further comprising:

an act of using one or more other different durable file identifiers to access each of the one or more secondary shadow copies respectively, each of the one or more other different durable file identifiers durable across changes to the file name of the file such that if the file name is changed the one or more other different durable file identifier continue to reference the appropriate secondary shadow copy.

10. The method as recited in claim 8, wherein the act of using a durable file identifier to access the master shadow copy comprises an act of using a durable identifier that includes a globally unique identifier for the volume the master shadow copy is stored on.

11. The method as recited in claim 8, wherein the act of using the durable file identifier to access the master shadow copy, comprises:

an act of using the durable file identifier to determine that the current master shadow copy is inaccessible;

an act of assigning one of the secondary shadow copies as the new master shadow copy in response to detecting that the current master shadow copy is inaccessible; and an act of using a durable file identifier for the new master shadow copy to access the new master shadow copy.

12. The method as recited in claim 8, wherein the act of indicating to the application that the file operation was performed on the file perceived to be stored on the first volume comprises an act of indicating to the application that the file operation was performed on the file perceived to be stored on the first volume even though the file operation was actually performed on a shadow copy of the file.

13. At a computer system including a first volume storing one or more files, a method for enhancing the storage capabilities of the computer system in response to a change in volume configuration, the method comprising:

an act of receiving an indication that a new volume has been attached to the computer system;

an act of referring to configuration rules to determine how a portion of available storage space on the new volume is to be utilized to enhance the storage capabilities of the computer system;

an act of logically combining the storage capacity of the first volume and a portion of the available storage space of the new volume, the logically combined storage capacity represented to applications at the computer system as the storage capacity of the first volume;

an act of creating a directory within an existing directory structure of the new volume in response to receiving the indication and in accordance with the configuration rules, the subdirectory for storing shadow copies of files stored on the first volume;

an act of copying a file from the first volume into the created directory to implement a storage capability enhancement indicated in the configuration rules; and an act of adding file metadata to a file table entry for the file stored on the first volume, the file metadata identifying the copy of the file in the created directory as a shadow copy of the file.

14. The method as recited in claim 13, wherein the act of referring to configuration rules to determine how a portion of available storage space on the new volume is to be utilized to enhance the storage capabilities of the computer system comprises an act of referring to configuration rules to determine that a portion of available storage space on the new volume is to be utilized to migrate files from the another volume to free up storage space on the other volume.

15. The method as recited in claim 13, wherein the act of referring to configuration rules to determine how a portion of available storage space on the new volume is to be utilized to enhance the storage capabilities of the computer system comprises an act of referring to configuration rules to determine that a portion of available storage space on the new volume is to be utilized to replicate files from another volume to provide redundant storage of the files.

16. The method as recited in claim 13, wherein the act of referring to configuration rules to determine how a portion of available storage space on the new volume is to be utilized to enhance the storage capabilities of the computer system comprises an act of referring to a system registry to determine how a portion of available storage space on the new volume is to be utilized to enhance the to determine how a portion of available storage space on the new volume is to be as utilized to enhance the storage.

17. The method as recited in claim, 13, wherein the act of creating a directory within an existing directory structure of the new volume in response to receiving the indication and in accordance with the configuration rules comprises an act of creating a directory without altering the configuration of any files already stored on the new volume.

18. The method as recited in claim 13, wherein the act of copying a file from the first volume into the created directory to implement a storage capability enhancement indicated in the configuration rules comprises an act of copying a file from the first volume into the created directory to migrate the file from the first volume to the new volume.

19. The method as recited in claim 13, wherein the act of copying a file from the first volume into the created directory to implement a storage capability enhancement indicated in the configuration rules comprises an act of copying a file from the first volume into the created directory to replicate the file on the new volume.

20. The method as recited in claim 13, wherein the act of adding reparse data to a file table entry for the file stored on the first volume comprises an act of adding a durable identifier for the shadow copy of the file to a master file table.

* * * * *